Feb. 2, 1971  D. B. GOLD  3,560,022

VACUUM LOCK CHEST SUPPORT

Filed March 18, 1969

INVENTOR
DWIGHT B. GOLD

BY *Sughrue, Rothwell, Mion, Zinn & Macpeak*

ATTORNEYS

United States Patent Office 3,560,022
Patented Feb. 2, 1971

3,560,022
VACUUM LOCK CHEST SUPPORT
Dwight B. Gold, 9471 Olive St., St. Louis, Mo. 63132
Filed Mar. 18, 1969, Ser. No. 808,121
Int. Cl. B60p 7/10
U.S. Cl. 280—179
2 Claims

ABSTRACT OF THE DISCLOSURE

A thin sheet of polyurethane is completely compressed between an overlying chest and an underlying support surface to create a "vacuum lock" coupling therebetween.

BACKGROUND OF THE INVENTION

Field of the invention

This invention relates to holddown supports for maintaining an article in a given position, under inertial restraint and in contact with an underlying support surface and more particularly a holddown device which requires no mechanical clamping to either the underlying support or the overlying article.

Description of the prior art

It is conventional to employ foam material as a shock absorbing support. In general, where the foam material is providing a shock absorbing function as its primary concern, it is conventional to fixedly couple the opposed surfaces of the foam material to the underlying support surface and to the overlying article or machinery supported thereon. However, where material in pad form is employed as both a vibration absorbing pad and a vacuum holddown device, it is conventional to provide a plurality of spaced cups or pockets on opposed surfaces or at least on one surface of the pad to create due to the compression of the pad, individual vacuum pockets tending to maintain the pad in position on the underlying support and thus the article carried thereby in a fixed position under suitable inertial restraint.

Pads of this type are characterized by being resilient but of necessity must be configured on either the upper or lower surface or both with the cups or pockets to create the required suction.

SUMMARY OF THE INVENTION

The present invention is directed to a vacuum lock support in the form of a thin sheet or pad of foamed polyurethane or foam rubber or any porous sponge-like material that will allow the air to escape, which, because of its foam construction, is composed of small, irregular pockets of air and whereby, under the weight of the cabinet or other article to be supported, the air is pushed out due to the porosity of the material leaving a solidified material which acts as a gasket between the bottom surface of the article being supported and the support surface underlying the thin sheet. The air pressure exerted on the outside of the porous pad creates, in conjunction with the loss of air pressure from within, a vacuum lock.

In particular, the present invention is directed to a vacuum lock chest support for maintaining a chest in position on the bed of a truck which has spaced side walls and where the width of the chest is slightly less than the distance between the body side walls. The polyurethane sheet extends completely across the bottom of the chest with its ends extending upwardly between the truck body side walls and the sides of the chest, with both the side wall portions and the bottom portion of the sheet being completely compressed.

DESCRIPTION OF THE PREFERRED EMBODIMENT

Figure 1:
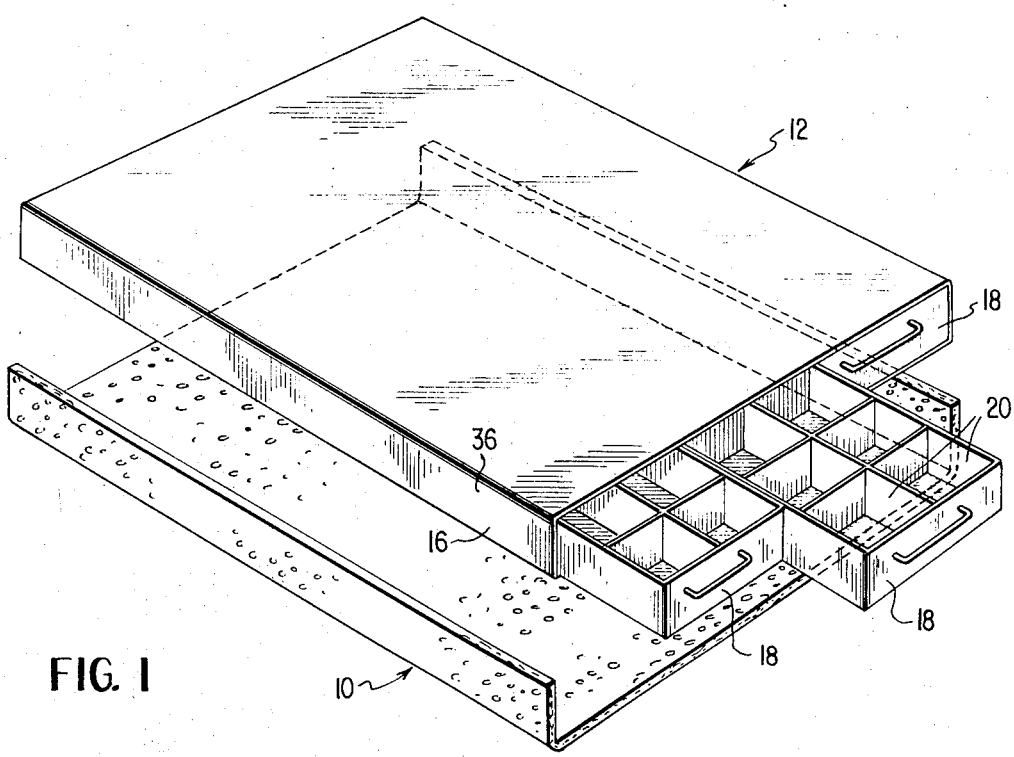
FIG. 1 is an exploded, perspective view of the thin sheet of polyurethane which acts as the vacuum lock chest support for a rectangular, multi-drawer tool chest.

Referring to the drawings, the unitary, vacuum lock chest support of the present invention is shown as comprising a thin sheet of polyurethane or other porous material in excess of ½ inch in thickness, which is adapted to support under inertial restraint, the rectangular chest indicated at 12 which is of such a configuration as to present an extremely large bottom surface 14. The present invention has particular application to a tool chest of the configuration shown including a rectangular casing 16 which carries in conventional fashion, three elongated and removable drawers 18, each having separate compartments 20 to receive various small parts. The parts may be metal, making the overall chest when loaded, extremely heavy. It is conventional for salesmen and the like to position a chest such as that indicated at 12 upon the bottom surface or bed of a vehicle such as a truck with the end of the chest carrying the drawer fronts exposed at the rear of the truck allowing ease of access to the individual drawers 18 carried by the cabinet sliding the same relative to the casing 16 as indicated in FIG. 1.

Figure 2:
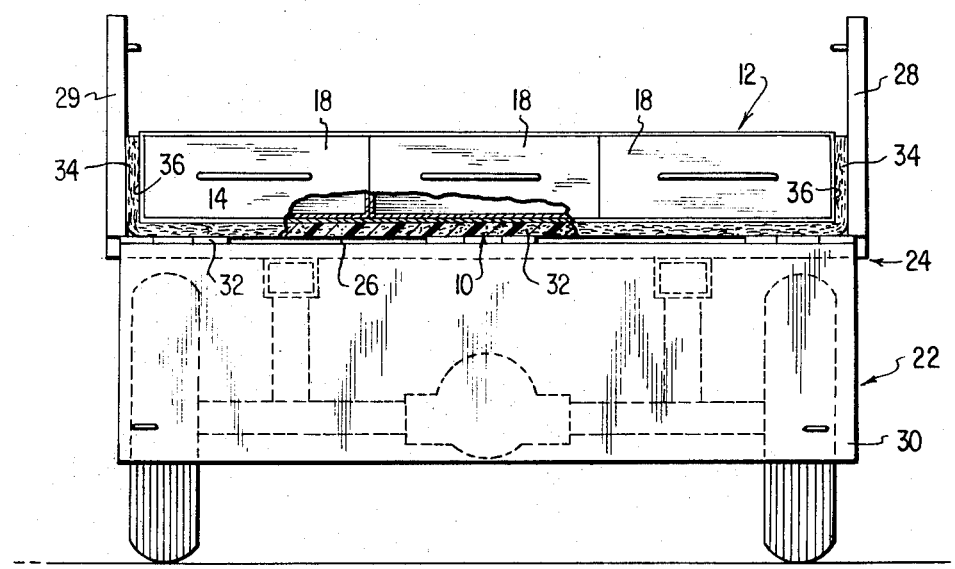
FIG. 2 is an end elevational view of a truck, the bed of which receives the chest and the interspersed vacuum lock chest support of the invention of FIG. 1.

Such an arrangement is shown in FIG. 2 in which a truck 22 has a body 24 including a bed 26 and laterally spaced side walls 28 with the distance therebetween being slightly in excess of the width of the tool cabinet 12. The tail gate 30 of the truck body is hinged at 32 and is shown in its open or lowered position allowing free access to the individual drawers 18 carrier by the cabinet 12.

The present invention as stated previously is directed to a holddown device of simplified construction for maintaining the relatively heavy, loaded metal cabinet or other device 12 in position on the truck bed 26, under inertial restraint but allowing the cabinet to be lifted therefrom without the necessity of removing bolts or other mechanical coupling elements. The support consists of the thin sheet or pad 10 of polyurethane or other porous material preferably having a central or bottom portion and upturned ends 34 which are positioned between the spaced side walls 28 of the truck body and the sides 36 of the cabinet 12. The thin sheet of polyurethane being positioned between the bottom 14 of the chest and side walls 36 and the respective truck bed 26 and truck side walls 28, under the weight of the cabinet, is completely compressed such that the irregular pockets of air inherent in the foamed polyurethane passes through the material due to its inherent porosity leaving a completely solidified mass of polyurethane which acts as a vacuum gasket between the bottom and sides of the cabinet and the truck side walls and the truck bed. The solidified sheet 10 is thus clamped tightly to the cabinet walls and the underlying support of the truck bed as well as side walls 28 of the truck body and the cabinet sides and because of the atmospheric pressure acting from without, creates an inherent vacuum lock between the underlying support and the overlying cabinet 12.

While the invention has been described in conjunction with a relatively thin but heavy metal parts cabinet which is to be carried on the bed of a truck under the "vacuum lock" or holddown principle as a result of the complete compression of the foam polyurethane sheet which forms the same, the chest is only one type of article which may be advantageously supported in this manner and in fact the chest or other article may sit on the floor of a building or on top of another chest as well as on a bed of a vehicle as shown.

What is claimed is:

1. In a vehicle containing laterally spaced side walls which define therebetween a bed and a chest having a width slightly less than the distance between said side walls supported on said bed, the improvement comprising a thin sheet of foamed material extending completely across the bottom of said chest and having ends extending upwardly between the sides of said chest and said laterally spaced side walls whereby said chest is both cushioned and held in place.

2. The vacuum lock chest support as claimed in claim 1 wherein said thin sheet is of foamed polyurethane and is completely compressed under the weight of said chest.

References Cited

UNITED STATES PATENTS

| | | | |
|---|---|---|---|
| 2,128,118 | 8/1938 | Burford | 248—350 |
| 2,910,264 | 10/1959 | Lindenberger | 248—362 |

LEO FRIAGLIA, Primary Examiner

R. R. SONG, Assistant Examiner